United States Patent
Sinha et al.

(10) Patent No.: US 9,773,119 B2
(45) Date of Patent: Sep. 26, 2017

(54) PARALLEL AND HIERARCHICAL PASSWORD PROTECTION ON SPECIFIC DOCUMENT SECTIONS

(71) Applicants: Anand Sinha, Bangalore (IN); Vinay Sheel, Bangalore (IN)

(72) Inventors: Anand Sinha, Bangalore (IN); Vinay Sheel, Bangalore (IN)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 14/631,610

(22) Filed: Feb. 25, 2015

(65) Prior Publication Data

US 2016/0357971 A1 Dec. 8, 2016

(51) Int. Cl.
*G06F 21/60* (2013.01)
*H04L 9/08* (2006.01)

(52) U.S. Cl.
CPC .......... *G06F 21/602* (2013.01); *H04L 9/0863* (2013.01); *H04L 2209/24* (2013.01)

(58) Field of Classification Search
CPC .. G06F 21/602; H04L 9/0816; H04L 2209/24
See application file for complete search history.

(56) References Cited

U.S. PATENT DOCUMENTS

| | | | | |
|---|---|---|---|---|
| 6,981,141 B1 * | 12/2005 | Mahne | .................... | G06F 21/80 713/165 |
| 7,000,119 B1 * | 2/2006 | Jia | .......................... | G06F 21/14 380/37 |
| 7,480,385 B2 * | 1/2009 | Weber | ................. | H04L 63/0428 380/277 |
| 8,850,227 B1 * | 9/2014 | Krahn | ..................... | G06F 21/57 380/277 |
| 8,935,807 B2 * | 1/2015 | Sinha | ...................... | G06F 21/62 726/28 |
| 9,465,947 B2 * | 10/2016 | Nakhjiri | ................... | H04L 63/06 |
| 2003/0115481 A1 * | 6/2003 | Baird | .................. | G06F 21/6218 726/4 |
| 2004/0049687 A1 * | 3/2004 | Orsini | ..................... | G06F 21/31 713/189 |
| 2006/0177061 A1 * | 8/2006 | Orsini | ................... | G06F 21/606 380/268 |
| 2007/0118731 A1 * | 5/2007 | Zizzi | ....................... | G06F 21/34 713/153 |

(Continued)

*Primary Examiner* — Joseph P Hirl
*Assistant Examiner* — Stephen Gundry
(74) *Attorney, Agent, or Firm* — Fish & Richardson P.C.

(57) ABSTRACT

The present disclosure involves systems and computer implemented methods for protecting portions of electronic documents. An example method includes receiving a request for access to an electronic file having sections, at least one section encrypted using a first key based on a first password. A second key is generated in response to receiving a second password, wherein the second key is generated based on the second password. The second key is compared to the first key. If the second key is identical to the first key, the least one section of the electronic file encrypted using the first key is decrypted using the second key. The electronic file is then presented such that the section(s) previously encrypted using the first cryptographic key is made visible. If the second key is not identical to the first, the electronic file is presented with the encrypted section(s) obscured.

5 Claims, 12 Drawing Sheets

(56) References Cited

U.S. PATENT DOCUMENTS

| | | | |
|---|---|---|---|
| 2008/0118064 A1* | 5/2008 | Bhogal | G06F 21/6218 380/243 |
| 2008/0209231 A1* | 8/2008 | Kim | G06F 21/10 713/189 |
| 2008/0212781 A1* | 9/2008 | Vennelakanti | G06F 21/6218 380/277 |
| 2008/0232598 A1* | 9/2008 | Vennelakanti | G06F 21/62 380/279 |
| 2008/0235221 A1* | 9/2008 | Burns | G06F 17/30716 |
| 2010/0299313 A1* | 11/2010 | Orsini | H04L 9/085 707/652 |
| 2012/0290849 A1* | 11/2012 | Simske | H04L 9/3247 713/189 |
| 2012/0317414 A1* | 12/2012 | Glover | G06Q 10/101 713/165 |
| 2013/0024687 A1* | 1/2013 | Lumb | G06F 21/62 713/165 |
| 2013/0124560 A1* | 5/2013 | O'Sullivan | G06F 17/3087 707/769 |
| 2013/0238900 A1* | 9/2013 | Leggette | H04L 63/0428 713/165 |
| 2013/0254537 A1* | 9/2013 | Bogorad | H04L 9/0822 713/165 |
| 2014/0150114 A1* | 5/2014 | Sinha | H04W 12/00 726/28 |
| 2014/0208418 A1* | 7/2014 | Libin | G06F 21/6209 726/19 |
| 2014/0244602 A1* | 8/2014 | Rastogi | H03M 7/30 707/693 |
| 2014/0344952 A1* | 11/2014 | Kulick | G06F 21/6245 726/28 |
| 2014/0373165 A1* | 12/2014 | Margolin | G06F 21/606 726/26 |
| 2015/0006895 A1* | 1/2015 | Irvine | G06F 21/6254 713/171 |
| 2015/0186657 A1* | 7/2015 | Nakhjiri | H04L 63/06 713/155 |
| 2015/0363605 A1* | 12/2015 | Plastina | G06F 21/6218 726/28 |
| 2015/0371613 A1* | 12/2015 | Patel | G06F 21/10 345/549 |
| 2016/0148014 A1* | 5/2016 | Peterson | G06F 21/6245 726/28 |

* cited by examiner

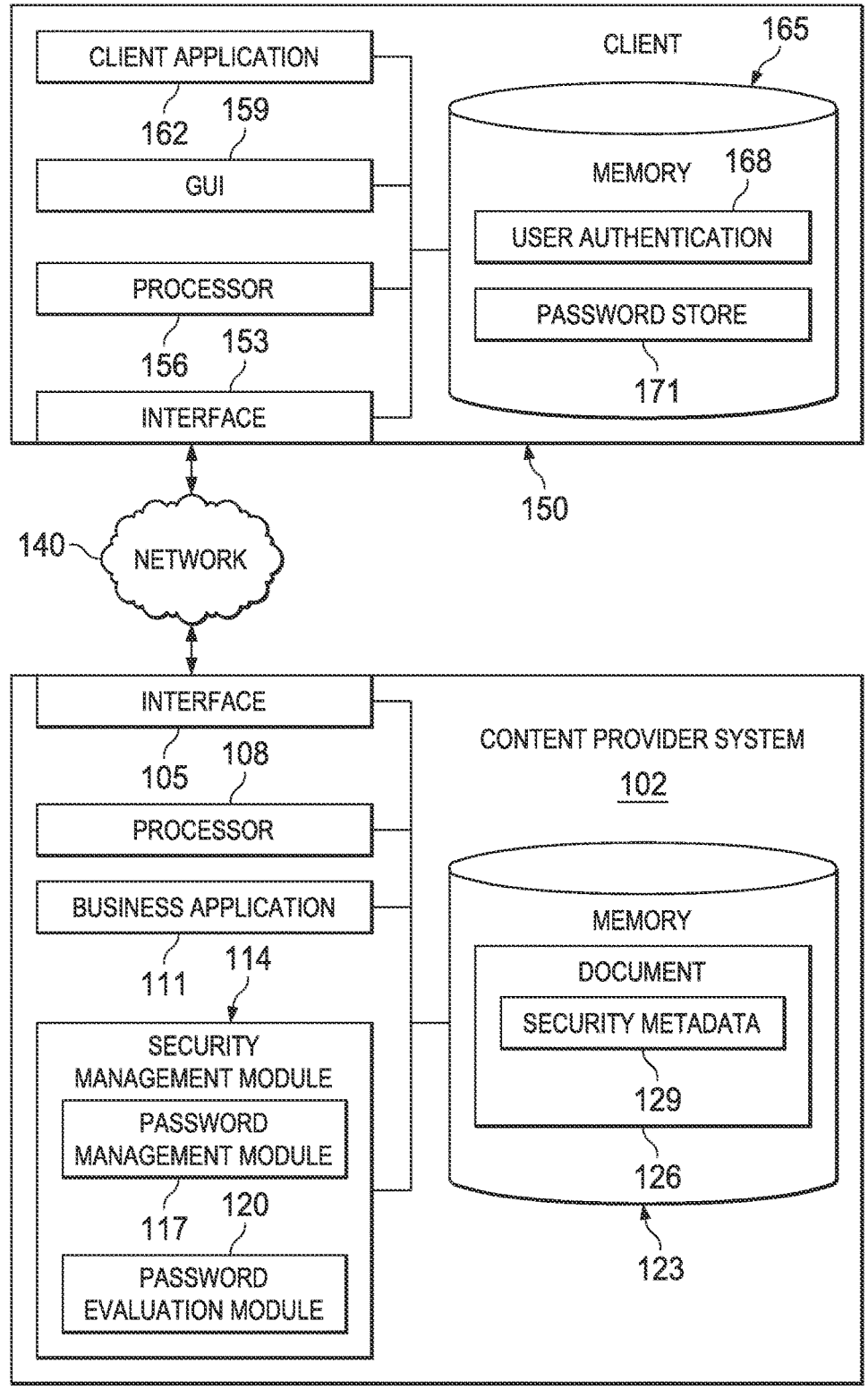

| SECTIONS | ACCESS REQUIRED |
|---|---|
| SECTION A | PUBLIC |
| SECTION B | ONLY TO A RESTRICTED GROUP |
| SECTION C | PUBLIC |
| SECTION D | ONLY TO A RESTRICTED GROUP (SAME AS SECTION B) |
| SECTION E | PUBLIC |

FIG. 2A

| METADATA [(np1 : SD,ED)] | A | $E_{k1}(B)$ | C | $E_{k1}(D)$ | E |
|---|---|---|---|---|---|

FIG. 2B

| SECTIONS | ACCESS REQUIRED |
|---|---|
| ...SECTIONS... | ... |
| SECTION B | ONLY TO GROUP G1 |
| ...SECTIONS... | ... |
| SECTION D | ONLY TO GROUP G2 |
| ...SECTIONS... | ... |
| SECTION F | ONLY TO GROUP G1 |
| ...SECTIONS... | ... |

FIG. 4A

Back  Bank Management Summary  3:07 PM  53%

Retail Risk Mgmt

| Year | Retail | Commercial | Wealth | # Losses | Expected Loss | Loss Difference |
|---|---|---|---|---|---|---|
| 2008 | $52,719,115 | $43,169,937 | $2,455,148 | 2,354 | 1,500 | (854) |
| 2009 | $32,912,408 | $63,469,692 | $3,615,579 | 1,982 | 2,014 | 32 |
| 2010 | $38,385,868 | $59,167,649 | $2,467,973 | 2,044 | 2,089 | 45 |
| 2011 | $34,546,742 | $55,161,221 | $2,965,755 | 2,075 | 1,990 | (85) |

| Loan & Lease Analysis (%) | Current Qtr | Rank to Peer Group | Trend |
|---|---|---|---|
| Net Loss to Average Total LN&LS | 0.35 | -1 | |
| LN&LS Allowance to Total LN&LS | 2.63 | -0.15 | |
| LN&LS Allowance to Net Losses (X) | 4.61 | 2.6 | |
| Nonaccrual | 1.83 | -1.32 | |
| Total LN&LS-90+ Days Past Due | 1.14 | 0.96 | |

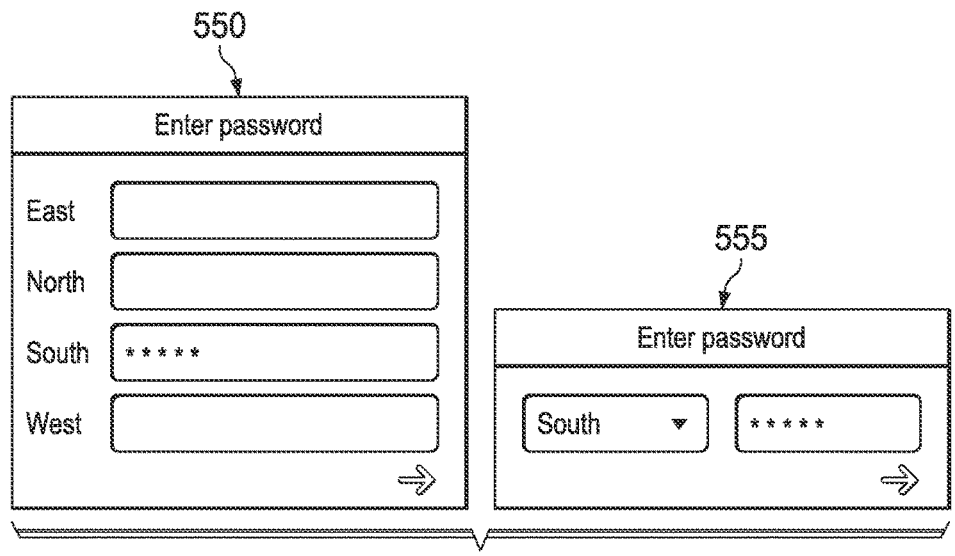

PARALLEL AND HIERARCHICAL PASSWORD PROTECTION ON SPECIFIC DOCUMENT SECTIONS

TECHNICAL FIELD

The present disclosure relates to computer systems and computer-implemented methods for protecting portions of electronic documents using parallel and/or hierarchical password protection on specific sections of those electronic documents.

Sensitive data is, by definition, required to be restricted to authorized users and prohibited from access by random users. Typical solutions using authentication and authorization schemes, such as user credentials, are used throughout organizations. Existing solutions allow entire documents to be protected using a password or other authentication. If a user knows the password, he or she is provided access to the document. Users who do not have the knowledge of the password cannot view the document unless the password protection is removed from the document or if the password is supplied.

SUMMARY

The present disclosure involves systems, software, and computer-implemented methods for protecting portions of electronic documents using parallel and/or hierarchical password protection on specific sections of those electronic documents.

One computer-implemented method includes: receiving a request to provide access to an electronic file to a user, the electronic file having a plurality of sections, wherein at least one section is encrypted using a first cryptographic key, the first cryptographic key generated based on a first password using a first key generation mechanism; generating a second cryptographic key in response to receiving a second password from a user requesting access to the electronic file, wherein the second cryptographic key is generated based on the second password using the first key generation mechanism; comparing the second cryptographic key to the first cryptographic key to determine whether the second cryptographic key is identical to the first cryptographic key; in response to determining the second cryptographic key is identical to the first cryptographic key, decrypting the at least one section of the electronic file encrypted using the first cryptographic key with the second cryptographic key; and presenting the electronic file at a user interface, the presented electronic file making visible the at least one section previously encrypted using the first cryptographic key.

In some implementations, in response to determining the second cryptographic key is not identical to the first cryptographic key, the method may include presenting the electronic file at a user interface, the presented electronic file obscuring the at least one section encrypted using the first cryptographic key. In some implementations, the method may also include receiving a request to provide access to the at least one obscured section encrypted using the first cryptographic key; generating a third cryptographic key in response to receiving a third password from a user requesting access to the electronic file, wherein the third cryptographic key is generated based on the third password using the first key generation mechanism; comparing the third cryptographic key to the first cryptographic key to determine whether the third cryptographic key is identical to the first cryptographic key; in response to determining the third cryptographic key is identical to the first cryptographic key, decrypting the at least one section of the electronic file encrypted using the first cryptographic key with the third cryptographic key; and presenting the electronic file at a user interface, the presented electronic file making visible the at least one previously obscured section.

Other implementations may include wherein the electronic file includes a set of security metadata, the set of security metadata including a set of section definitions and a description of the encryption applied to one or more sections. In some instances, the set of security metadata is embedded within the electronic file.

Other implementations may include wherein a first section of the electronic file is encrypted using a first cryptographic key generated based on the first password, and wherein a second section of the electronic file is encrypted based on a third cryptographic key generated based on a third password different than the first password.

A second example method includes: receiving a request to provide access to an electronic file to a user, the electronic file having a plurality of sections, wherein at least two of the sections of the electronic document are encrypted using at least two different hierarchical cryptographic keys, wherein a relatively higher level section is encrypted using a first hierarchical cryptographic key, and wherein a relatively lower level section is encrypted using a second hierarchical cryptographic key different than the first hierarchical cryptographic key, and wherein the second hierarchical cryptographic key is encrypted by the first hierarchical cryptographic key, wherein the first hierarchical cryptographic key is generated based on a first password using a first key generation mechanism, and wherein the second hierarchical cryptographic key is generated based on a second password using the first key generation mechanism; generating a third hierarchical cryptographic key in response to receiving a third password from a user requesting access to the electronic file, wherein the third hierarchical cryptographic key is generated based on the third password using the first key generation mechanism; comparing the third hierarchical cryptographic key to the first hierarchical cryptographic key and the second hierarchical cryptographic key to determine whether the third hierarchical cryptographic key is identical to the first hierarchical cryptographic key or the second hierarchical cryptographic key; in response to determining the third hierarchical cryptographic key is identical to the first hierarchical cryptographic key, decrypting the relatively higher level section encrypted using the first hierarchical cryptographic key with the third hierarchical cryptographic key; in response to determining that the second hierarchical cryptographic key is encrypted using the first hierarchical cryptographic key, decrypting the second hierarchical cryptographic key using the third hierarchical cryptographic key; decrypting the relatively lower level section encrypted using the second cryptographic key with the decrypted second hierarchical cryptographic key; and in response to decrypting the relatively lower level section, presenting the electronic file at a user interface, the presented electronic file making visible the relatively higher level section and the relatively lower level section.

In some implementations, the method may further include, in response to determining the third hierarchical cryptographic key is identical to the second hierarchical cryptographic key, decrypting the relatively lower level section encrypted using the second hierarchical cryptographic key with the third hierarchical cryptographic key; and presenting the electronic file at a user interface, the presented electronic file making visible the relatively lower level section and obscuring the relatively higher level section.

In some implementations, the electronic file can include a set of security metadata, the set of security metadata including a set of section definitions and a description of the encryption applied to one or more sections. The set of security metadata is embedded within the electronic file.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example system for protecting portions of electronic documents using parallel and/or hierarchical password protection on specific sections of those electronic documents.

FIGS. 2A-B are illustrations of access tables and metadata descriptions of electronic document security in a first parallel password scenario.

FIGS. 3A-D are illustrative screenshots illustrating the addition of parallel password protection onto an example electronic document in the first parallel password scenario.

FIGS. 4A-B are illustrations of access tables and metadata descriptions of electronic document security in a second parallel password scenario.

FIGS. 5A-C are illustrative screenshots illustrating the addition of an alternative parallel password scheme onto an example document.

FIGS. 6A-C are illustrations related to a hierarchical password scheme.

DETAILED DESCRIPTION

Figure 3B:

The present disclosure describes systems and tools for protecting portions of electronic documents using parallel and/or hierarchical password protection on specific sections of those electronic documents. In many cases, different parts of individual documents may have varying degrees of sensitivity. For example, some electronic documents may include information such that only a few authorized individuals or persons of particular roles should be able to see a certain part thereof. In many cases, different sets of users should be able to see different sensitive parts of the electronic document. As an example, users associated with and/or responsible for a Northern sales region for a company may not be authorized to see the data of a Southern sales region, and vice versa. In prior solutions, a single password would typically be used in a single document to provide protection, where a user providing the correct password would then be able to see the entire electronic document. In those instances, different electronic documents providing a portion of the overall electronic document must be generated, password protected, and distributed to different recipients in order to maintain security. Additionally, some users may be authorized to see the entire electronic document, or multiple portions or sections of the electronic document, while other users may be authorized to see only a single portion of the document.

Currently, the solution to protect sensitive information is to create different electronic documents based on the same underlying data for different sets of authorized users. In business intelligence user cases, this may be achieved through multiple reports being generated wherein different groups of users receive only the relevant data to which they have access. For example, the users responsible for a South region receive an electronic document storing on South-specific data. However, if two groups wish to collaborate and understand each other's problems and help provide solutions, the users will need to re-share their documents amongst themselves to view and collaborate on the necessary content. Not only is there the difficulty of sharing these electronic documents, but a higher risk of data leakage may also arise.

The present solution attempts to solve these issues by providing a single electronic document wherein different portions or sections of the electronic document can be provided different passwords such that a single electronic document can include multiple sets of sensitive data, wherein individuals can enter a password relating to a section of sensitive data to view said authorized data, while other sections remain protected. In the present application, the terms "portion" or "section" may refer, in various examples, to any one of the following, as well as a group including one or more of: a single cell of data, a single row of data, a single column of data, a single table containing data, a single chart, a word, a letter, a sentence, a paragraph, a page, etc.

Several particular use cases are provided as examples for how an electronic document is provided and made available. In a first use case, the electronic document may be globally accessible with certain sections being identified as sensitive, and therefore being protected and/or encrypted. In a second use case, the electronic document as a whole may be sensitive and therefore require a first password for initially accessing the document, while certain portions may be relatively more sensitive with sections being further password protected. In a third use case, an electronic document (whether sensitive as a whole or not) may include two or more sensitive sections, where different sections are viewable by different users by using different passwords. A fourth use case involves the application of hierarchical sensitivity levels. In this use case, an electronic document may include multiple levels of passwords for different users, where a first password for users with the highest level of authentication allows the additional passwords to be derived from the first password. Lower levels of authentication may only allow certain sections to be viewed while maintaining protection of other sections. The example use cases and the example systems for performing their operations will be described herein.

Turning to the illustrated embodiment, FIG. 1 is a block diagram 100 illustrating an example system for protecting portions of electronic documents using parallel and/or hierarchical password protection on specific sections of those electronic documents. As illustrated in FIG. 1, system 100 is a client-server system capable of providing sensitive documents that can be protected using parallel and/or hierarchical passwords. In some instances, a client system alone may be sufficient to perform the operations of the system 100, such as when electronic documents are stored locally on the client 150 and wherein the mechanisms necessary to evaluate one or more passwords are available at the client 150. In other instances, the electronic documents may be requested by the client 150 from a backend server (e.g., content provider system 102), such that the server makes decisions and determinations as to whether particular sections of the electronic document will be presented to the user.

System 100 as illustrated includes or is communicably coupled with a content provider system 102, client 150, and network 140. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, content provider system 102 may be any computer system, computer, or processing device such as, for example, a blade server, general-purpose personal computer (PC), Mac®, workstation, UNIX-based workstation, or any other suitable device. Moreover, although FIG. 1 illustrates content provider system 102 as a single system, content provider system 102 can be implemented using two or more computers, systems, as well as computers other than servers, including a server pool. In other words, the present disclosure contemplates computers other than general-purpose computers, as well as computers without conventional operating systems. Further, illustrated content provider system 102 and client 150 may each be adapted to execute any operating system, including Linux, UNIX, Windows, Windows Phone, Mac OS X®, Java™, Android™, or iOS. According to one implementation, the illustrated systems may also include or be communicably coupled with a communication server, an e-mail server, a web server, a caching server, a streaming data server, and/or other suitable server or computer.

In general, content provider system 102 may be any suitable backend computing server or system storing electronic documents (e.g., documents 126) for presentation to users in response to requests for the same. The content provider system 102 is described herein in terms of responding to requests for presentation of electronic documents from users at client 150 and other clients. However, the content provider system 102 may, in some implementations, be a part of a larger system providing additional functionality. For example, content provider system 102 may be part of an enterprise business application or application suite providing one or more of enterprise relationship management, content management systems, document management, business intelligence analytics, customer relationship management, and others.

The illustrated content provider system 102 can store electronic documents 126 and, in response to requests from clients 150, provide the electronic documents 126 via responsive communications. In some instances, the content provider system 102 may store electronic documents 126 that are associated with security metadata 129 describing password security associated with the corresponding electronic document 126 as a whole, as well as specific sections and/or portions of the electronic document 126. The security metadata 129 includes and defines security and encryption information associated with the corresponding document. In one example, including those described in reference to several figures herein, the security metadata 129 may include a table identifying particular sections or portions of the corresponding electronic document 126 and identify the groups and/or individual who are authorized to access those sections. This table may be updated dynamically in response to changes made to the electronic document 126, such as when a new password is associated with a particular section of the electronic document 126. Additionally, the security metadata 129 may include a table defining the metadata, including a description of the protected and unprotected sections within the electronic document 126, as well as which particular keys are used to encrypt the corresponding sections. In some instances, the security metadata 129 can further include one or more of a cryptographic salt, a number of iterations, and a pseudorandom function, among others.

As illustrated, the content provider system 102 includes an interface 105, a processor 108, a business application 111, a security management module 114, and memory 123. In general, the content provider system 102 is a simplified representation of one or more systems and/or servers that provide the described functionality and is not meant to be limiting but rather an example of the systems possible.

The interface 105 is used by the content provider system 102 for communicating with other systems in a distributed environment—including within the environment 100—connected to the network 140, e.g., client(s) 150 and other systems communicably coupled to the network 140. Generally, the interface 105 comprises logic encoded in software and/or hardware in a suitable combination and operable to communicate with the network 140. More specifically, the interface 105 may comprise software supporting one or more communication protocols associated with communications such that the network 140 or interface's hardware is operable to communicate physical signals within and outside of the illustrated environment 100.

Network 140 facilitates wireless or wireline communications between the components of the environment 100 (i.e., between the content provider system 102 and client(s) 150, between different clients 150, and among others), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11ac/ad/af/a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the content provider system 102 includes a processor 108. Although illustrated as a single processor 108 in FIG. 1, two or more processors may be used according to particular needs, desires, or particular implementations of the environment 100. Each processor 108 may be a central processing unit (CPU), an application-specific integrated circuit (ASIC), a field-programmable gate array (FPGA), or another suitable component. Generally, the processor 108 executes instructions and manipulates data to perform the operations of the content provider system 102. Specifically, the processor 108 executes the algorithms and operations described in the illustrated figures, including the operations performing the functionality associated with the content provider system 102 generally, as well as the various software modules (e.g., the business application 111), including the functionality for sending communications to and receiving transmissions from client(s) 150.

The business application 111 represents an application, set of applications, software, software modules, or combination of software and hardware used to perform operations related to presenting and executing electronic documents 126. In the present solution, the business application 108 can perform operations including receiving requests for particular electronic documents 126, evaluating the request and any passwords provided by users (along with the security management module 114) associated with the request or provided after the electronic document 126 is presented, generating keys based on passwords supplied by users, and providing the protected and unprotected sections of the electronic document 126 based on, in some instances, the received passwords and keys generated therefrom. The business application 111 can include and provide various functionality to assist in the management and execution of providing the requested electronic documents 126. In some instances, the business application 111 may represent a business analytics application, such as SAP SE's Lumira application.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated in FIG. 1, the content provider system 102 includes a security management module 114. While the security management module 114 is illustrated apart from the business application 111, in some instances, the security management module 114 may be embedded within or included as part of the business application 111. In general, the security management module 114 manages and enforces protections associated with electronic documents 126 and as defined by the security metadata 129. The security management module 114 includes a password management module 117 and a password evaluation module 120. The password management module 117 performs operations associated with ensuring that protected portions of the electronic documents 126 are not presented to users without the appropriate password being received. Additionally, the password management module 117 can manage the application of new passwords to particular sections or portions of the electronic documents 126, including the identification of a particular section, the receipt of the password and related credentials used to protect the data, encryption of the data included in the identified section, and the writing and/or updating of the security metadata 129. When passwords are created, the password management module 117 may define a particular unique equation for generating encrypted keys, where the equation is stored along with or separate from the security metadata 129. The password evaluation module 120 can, after receiving a particular password from a user requesting access, perform the operations associated with determining what, if any, of the protected sections the password can open. The password evaluation module 120 identifies the corresponding unique encryption equation, uses the received password, and can identify which of the protected sections of the electronic document 126 can be decrypted and presented.

As illustrated, content provider system 102 includes memory 123, or multiple memories 123. The memory 123 may include any memory or database module and may take the form of volatile or non-volatile memory including, without limitation, magnetic media, optical media, random access memory (RAM), read-only memory (ROM), removable media, or any other suitable local or remote memory component, including one or more in-memory databases. The memory 123 may store various objects or data, including financial and/or business data, user information, behavior and access rules, administrative settings, password information, caches, applications, backup data, repositories storing business and/or dynamic information, and any other appropriate information including any parameters, variables, algorithms, instructions, rules, constraints, or references thereto associated with the purposes of the business application 111 and/or content provider system 102. Additionally, the memory 123 may store any other appropriate data, such as VPN applications, firmware logs and policies, firewall policies, a security or access log, print or other reporting files, as well as others. For example, illustrated memory 123 includes the plurality of electronic documents 126.

The illustrated environment 100 includes one or more clients 150. Client(s) 150 may be any computing device operable to connect to or communicate with content provider system 102, other clients (not illustrated), or other components via network 140, as well as with the network 140 itself, using a wireline or wireless connection, and can include a desktop computer, a mobile device, a tablet, a server, or any other suitable computer device. In general, client 150 comprises an electronic computer device operable to receive, transmit, process, and store any appropriate data associated with the environment 100 of FIG. 1.

As illustrated, client 150 includes an interface 153, a processor 156, a graphical user interface (GUI) 159, a client application 162, and memory 165. Interface 153 and processor 156 may be similar to or different than the interface 105 and processor 108 described with regard to content provider system 102. In general, processor 156 executes instructions and manipulates data to perform the operations of the client 150. Specifically, the processor 156 can execute some or all of the algorithms and operations described in the illustrated figures, including the operations performing the functionality associated with the client application 162 and the other components of client 150. Similarly, interface 153 provides the client 150 with the ability to communicate with other systems in a distributed environment—including within the environment 100—connected to the network 140.

Client 150 executes a client application 162. The client application 162 may operate with or without requests to the content provider system 102—in other words, the client application 162 may execute its functionality without requiring the content provider system 102 in some instances, such as by accessing particular electronic documents 126 stored locally on the client 150 (not shown). In others, the client application 162 may be operable to interact with the content provider system 102 by sending requests via network 140 to the content provider system 102 for particular electronic documents 126. In some implementations, the client application 162 may be a standalone web browser, a native iOS or Android application, as well as others. In some instances, the client application 162 may be an application that requests for presentation of content in electronic documents 126 from the content provider system 102 for presentation and/or execution on client 150. In some instances, client application 162 may be an agent or client-side version of the business application 111.

Memory 165 may be similar to or different from memory 123 of the content provider system 102. In general, memory 165 can store protected electronic documents, user authentication credentials 168, and a password store 171. The user authorization credentials 168 can be provided to the content provider system 102 to generally authorize and authenticate the user and/or client 150 when sending requests to the content provider system 102.

The illustrated client 150 is intended to encompass any computing device such as a desktop computer, laptop/notebook computer, mobile device, smartphone, personal data assistant (PDA), tablet computing device, one or more processors within these devices, or any other suitable processing device. For example, the client 150 may comprise a computer that includes an input device, such as a keypad, touch screen, or other device that can accept user information, and an output device that conveys information associated with the operation of the client application 162 or the client 150 itself, including digital data, visual information, or a GUI 159, as shown with respect to the client 150. Example GUIs 159 are presented below.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

FIGS. 2A-B are illustrations of access tables and metadata descriptions of electronic document security in a first parallel password scenario. The illustration of FIGS. 2A-B relate to the first use case scenario wherein an electronic document is globally accessible, but certain sections are sensitive. FIG. 2A presents a generic structure of the document.

In the illustrated solution, a user or process interacting with the electronic document can define a named password (np1) having password P1. In some instances, the user or process can define the password prior to sharing the electronic document, or later passwords can be added after initial sharing. In the example structure of FIG. 2A, sections B and D of the document were selected such that only those portions of the electronic document are deemed sensitive and are encrypted based on that password P1. Based on this, the defined password P1 can be distributed to individuals in a defined group (e.g., G1) through an external means (e.g., email, messaging, verbally, etc.), as the password is not stored in the document. Internally, P1 is used as a password that is supplied to a key derivation mechanism (for example, Password-Based Key Derivation Function 2 (PBKDF2)) to generate a key K1 that will be used for encryption of content in sections B and D.

In one example solution, a key derivation mechanism may include a cryptographic salt to ensure randomness of the keys derived from the same password. Using a salt can prevent rainbow-table and other attacks. A cryptographic salt is random data that is used as an additional input to hash a password or passphrase. For each password, a new salt can be randomly generated. Additionally, the key derivation mechanism may define a number of iterations to execute in order to lower or eliminate the likelihood of password cracking Both the salt and number of iterations may be non-sensitive information and, in some implementations, can be stored in plain text in the security metadata associated with the electronic document.

Generated key K1 is used to encrypt the data in section B—the output of the key derivation mechanism can be referred to as $E_{K1}(B)$. The output of the encryption is stored in the document instead of storing the original section B. Similarly, as the same restricted group G1 is to be provided access to the section D, the same key K1 is used to encrypt the data in section D, thereby generating output of $E_{K1}(D)$. Again, this output is stored in the protected electronic document instead of storing original section D. As the other portions of the electronic document are not sensitive, those parts need not be encrypted.

As described in reference to FIG. 1, the electronic document can be associated with a set of security metadata. The example metadata stored in the present use case is illustrated in FIG. 2B and indicates that there is a single named password np1. The security metadata can also store the details of the corresponding sections that are protected using the password for np1. Encryption details, such as the cryptographic salt and the number of iterations, can also be stored in the security metadata. To prevent unauthorized access to the data, neither the password P1 nor its derived key K1 are stored in the electronic document or the associated security metadata.

As illustrated in FIG. 2B, the phrase SD provides a description of which section is encrypted, while the phrase ED provides non-confidential details of the encryption parameters applied to encrypt the section (e.g., cryptographic salt, number of iterations, etc.). As illustrated, the security metadata indicates that sections A, C, and E are not encrypted, while sections B and D are encrypted using generated key K1.

For electronic documents where one or more passwords have been applied, upon reopening users may be prompted for a password corresponding to at least one protected section of the document. If the correct password (e.g., np1) is not supplied, only the publicly accessible data, if any, is displayed. Other sections may be shown, for example, as "Protected" or "Not Accessible." In alternative implementations, indications of protected or not accessible sections may be indicated in other visual, auditory, or other means. For example, a warning icon can be shown or the area may be blurred or otherwise obfuscated. In some instances, information providing a general description of the protected data may be provided, which can allow interested users to seek out and obtain the password for viewing the protected sections.

If a password is supplied in response to the prompt, the application attempts to regenerate the key using the supplied password. The key generation mechanism uses the supplied password as its input to output a generated key. The application then uses this key to attempt to decrypt the information. If the password supplied was incorrect, the generated key would be different from the key that was used to encrypt the content and the decryption will fail. If the supplied password is correct, and therefore the output of the key generation mechanism generates the correct key from the input, the decryption would be successful and any content associated with the generated key can be presented.

FIGS. 3A-D are illustrative screenshots 300 illustrating the addition of parallel password protection onto an example electronic document in the first parallel password scenario. FIG. 3A, in fact, shows an electronic document (in this example, a business intelligence report) before the electronic document is to be shared with others. FIG. 3B illustrates the result of a user selection a particular section of the electronic document (in this example, via a touch- and/or gesture-based indication) to be protected. In the illustrated example, the entire document is initially publically available. After applying the password to the selected section, only that selected section will be protected.

Figure 3C:

After selecting the top table 310 and as shown in FIG. 3C, a pop-up box 320 or other suitable indicator providing the option to protect the selected section with a password is provided. After the user selects box 320, a new pop-up box 330 or other suitable entry prompt is presented, providing the user with the option to enter a particular password name (e.g. np1) and corresponding password value. Once the value is entered and the password is submitted, the application generates a key (e.g., K1) from the password using a suitable key generation mechanism and encrypts the section using the generated key. Corresponding entries in the security metadata associated with the electronic document can be updated.

Figure 3D:
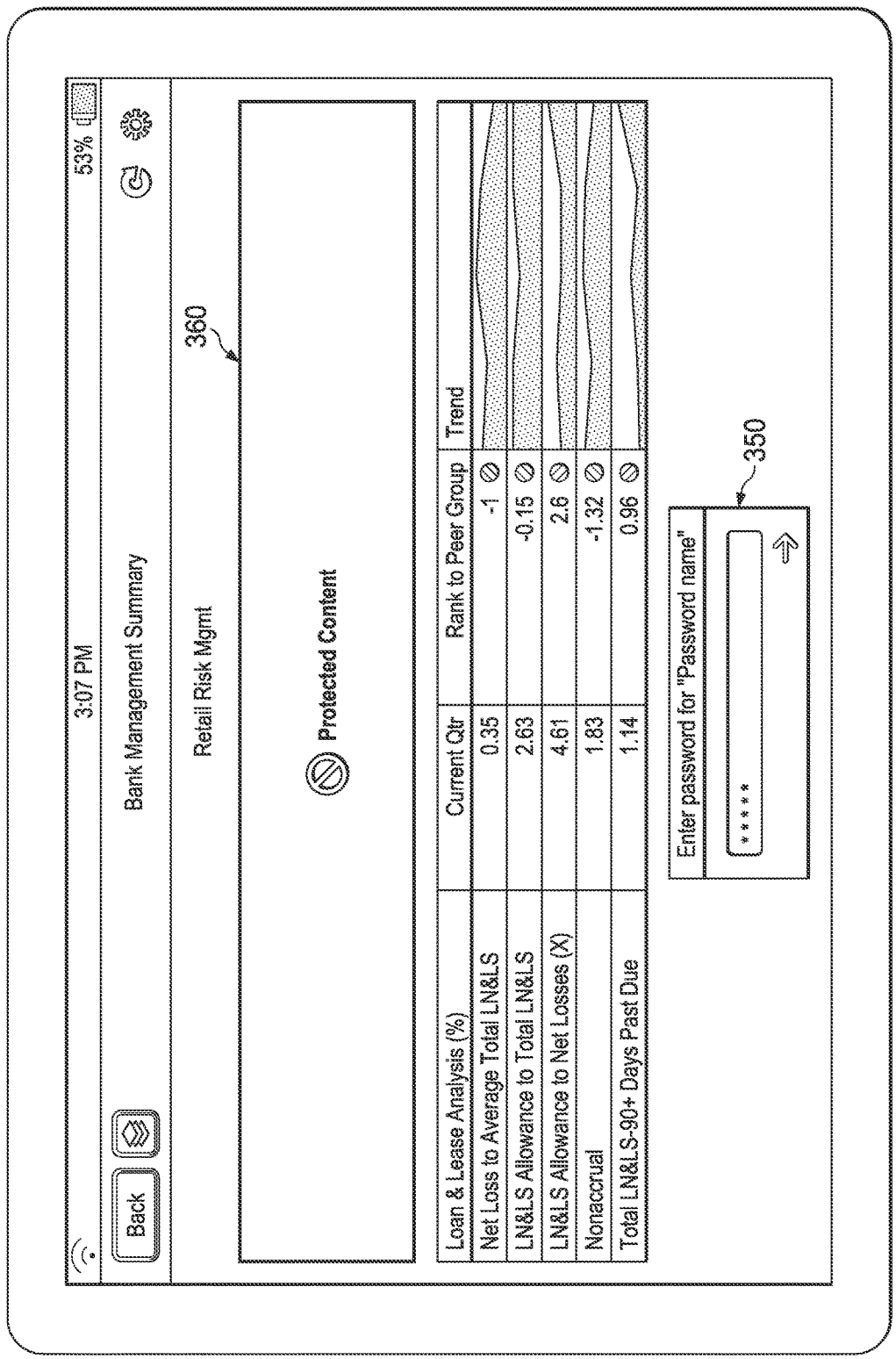

FIG. 3D illustrates the screens 300 and 350 presented to user in response to a later attempt to access the electronic document in which the password was applied in FIG. 3C. When the document is initially opened, a pop-up box 350 may be presented. In some instances, the pop-up box 350 may be presented on, next to, or in place of the electronic document 300. The pop-up box 350 prompts the user to enter a password to provide access to any protected sections of the document. If the password is correct, the screen 300 of FIG. 3A is presented to the user. If the password is incorrect, the screen of FIG. 3D is presented, where the protected section 360 includes a visual blocking of the protected content within that section 360. In some instances, users may acquire and/or enter the password after they have been presented a screen 300 similar to that of FIG. 3D. The user may click on, activate, or otherwise indicate an intention to view the protected section 360. In those instances, the pop-up box 350 may be presented, and the user can input the password to attempt accessing the protected section 360. Upon entering the correct password, the screen 300 of FIG. 3A may be presented allowing viewing of the protected section. If, however, an incorrect password is entered, the user may remain at screen 300 of FIG. 3D.

In a second alternative use case, the electronic document as a whole may be password-protected for initial accessing. In addition to the entire document being password-protected, specific sections of the document may be more sensitive, such that section-specific password(s) as described above may be required to access those specific sections.

In a third use case, an electronic document may have multiple sensitive sections, where at least two of the sections are protected using different passwords and corresponding encryption. FIG. 4A illustrates a table indicating that among the various sections of the electronic document, sections B and F are meant to be available to group G1, while section D is meant to be available to group G2. Since the document has sections which need to be protected for different groups (G1 and G2), the user or process sharing this document can define two named passwords (e.g., np1 and np2) having passwords P1 and P2, respectively. The password P1 can be distributed or otherwise made available to individuals in group G1, while the password P2 can be distributed or otherwise made available to individuals in group G2. Again, the passwords and/or the keys derived from these passwords are never stored as a part of the document to retain document security.

The password P1 is used as a passphrase that is supplied to a key derivation mechanism to generate a cryptographic key K1. Similarly, P2 is used to derive cryptographic key K2. The key K1 is used to encrypt the data in section B and F, with the output of the encryption being $E_{K1}(B)$ and $E_{K1}(F)$. Similarly, the key K2 is used to encrypt the data in section D, the output represented as $E_{K2}(D)$. The data for protected sections B, D, F are replaced by $E_{K1}(B)$, $E_{K2}(D)$, and $E_{K1}(F)$, respectively.

Similar to above, the security metadata associated with the electronic document stores information that identifies the fact that there are two named passwords (np1 and np2), as well as the details of the sections that are protected using the passwords for these named passwords. Additionally, the security metadata can also store any encryption details (e.g., cryptographic salt or number of iterations). The final structure of an example security metadata for an electronic document is illustrated in FIG. 4B using the notations described with regard to FIG. 2B.

When the document is reopened by a user, the user is prompted for one or both of passwords for np1 and np2. If either or both of the passwords are not supplied, then the relevant encrypted sections remain protected and are suitably indicated as "Protected" or "Not Accessible." If one of the passwords is provided and is correct, only the protected sections encrypted by a key generated based on that correct password is made visible while the other protected sections are not.

Figure 5A:
Figure 5C:
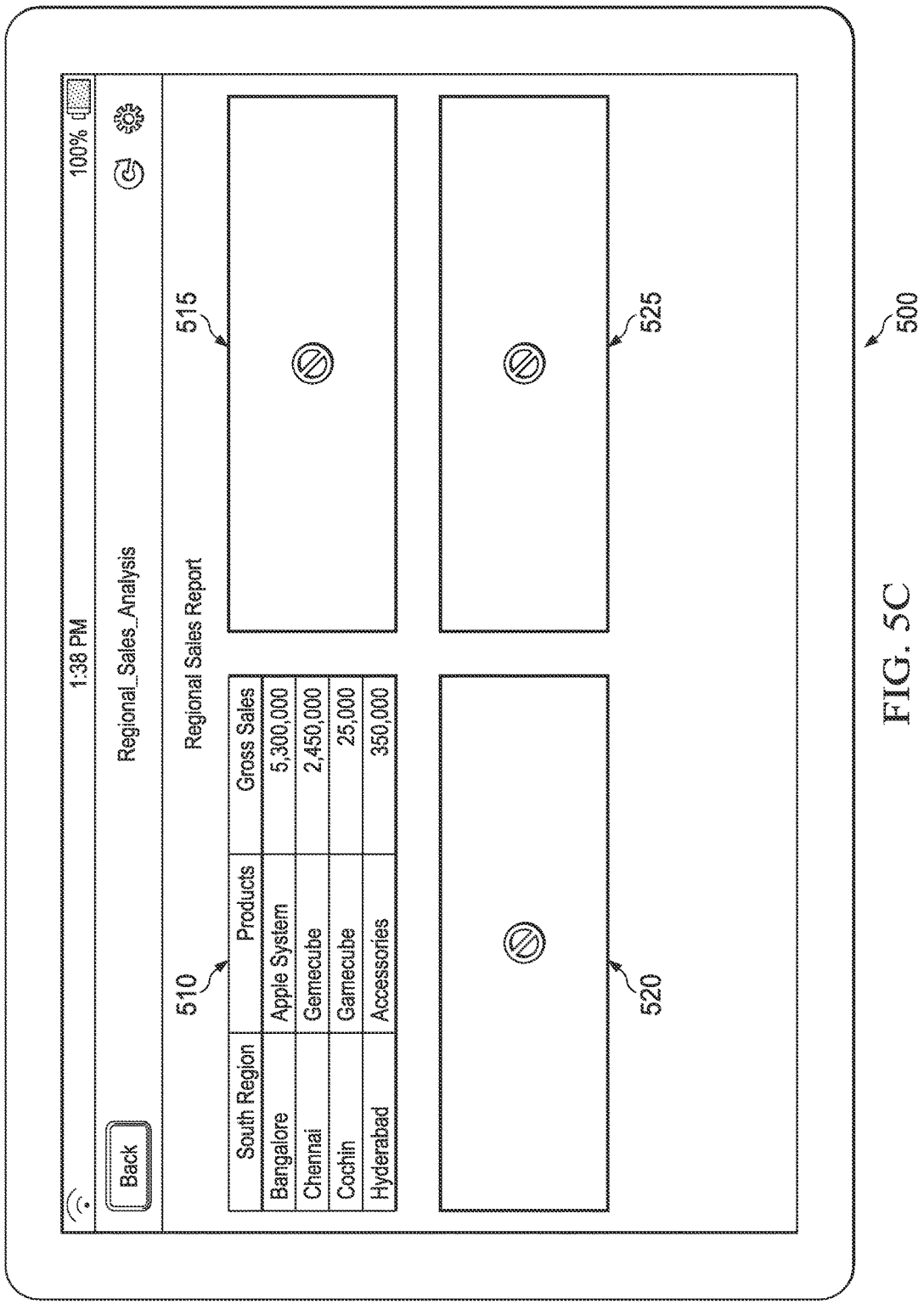

FIGS. 5A-C are illustrative screenshots illustrating the addition of an alternative parallel password scheme onto an example document. Specifically, the electronic document 500 in FIGS. 5A-C includes four sections, each section to be associated with a different password. In one example, the top-left quadrant 510 of the document 500 can be protected with a first password, the top-right quadrant 515 can be protected with a second password, the bottom-left quadrant 520 can be protected with a third password, and the bottom-right quadrant 525 can be protected with a fourth password. In this example, the data may be independent of each other such that different groups have a need to see data relevant to them. Therefore, four parallel named passwords are defined. In one example, quadrant 510 may have a password named "South," quadrant 515 may have a password named "West," quadrant 520 may have a password named "East," quadrant 525 may have a password named "North."

When the document is opened by a user, a prompt 550/555 identifying the named passwords and providing a location to enter the corresponding password is presented, as illustrated in FIG. 5B. Prompt 550 provides a listing of each named password and a corresponding entry location, while prompt 555 provides a dropdown box for selecting a particular named password prior to entering the corresponding password.

FIG. 5C illustrates an example electronic document 500 after a single one of the four passwords was entered into the appropriate prompt. Specifically, the password corresponding to the top-left quadrant 510 was entered correctly, and passwords for the remaining quadrants 515, 520, 525 were either not entered or entered incorrectly.

In a fourth use case, a solution for hierarchical passwords is provided. Restated, an electronic document may have hierarchical sensitivity levels. While some users may have passwords associated with a single section, other users may have passwords that can be used to open a hierarchical layer of the electronic document, which can then be cascaded through the decryption process to allow an additional one or more sections to be decrypted using the single hierarchical password. All portions of an electronic document may need to be exposed to some people (e.g., national managers, C-level employees, etc.), while only limited details may need to be exposed to others (e.g., regional salesman or manager).

In cases where an electronic document has sections that need to be seen by a hierarchy of people (e.g., a country head, a region head, a city head, etc.), each set of users may only need to see data corresponding to their job description. For example, the region head should be able to see data for the entire region and each city within, but not for the entire country, while a country head may need to see information on each region and then each city within each region.

In other cases, different persons may have different levels of clearance. When sections of the document can be categorized with different sensitivity levels (e.g., highly confidential, medium confidentiality, and low confidentiality, etc.), users with access to highly confidential sections may also be authorized to see all items of lower confidentiality, preferably based solely on their highly confidential password.

Using the other use cases above, this situation can be handled in one instance creating sections based on particular groups of people who need to see these sections, where those needing to see a hierarchy of sections (e.g., high, medium, and low confidentiality) may be provided or given access to multiple passwords. This approach, however, may be clumsy to users higher in the hierarchical chain due to the need to remember each of the multiple passwords.

In the present solution, a concept of "hierarchical" passwords has been developed, where a person relatively higher in a hierarchy can view content that is lower in the hierarchy by entering only one password. In those cases, users in a relatively lower hierarchical level (from the data's perspective) cannot see the information privy to people at higher hierarchical level, while those higher in the hierarchy can use their single password to decrypt information at each of the relatively lower hierarchical levels.

Figure 6B:
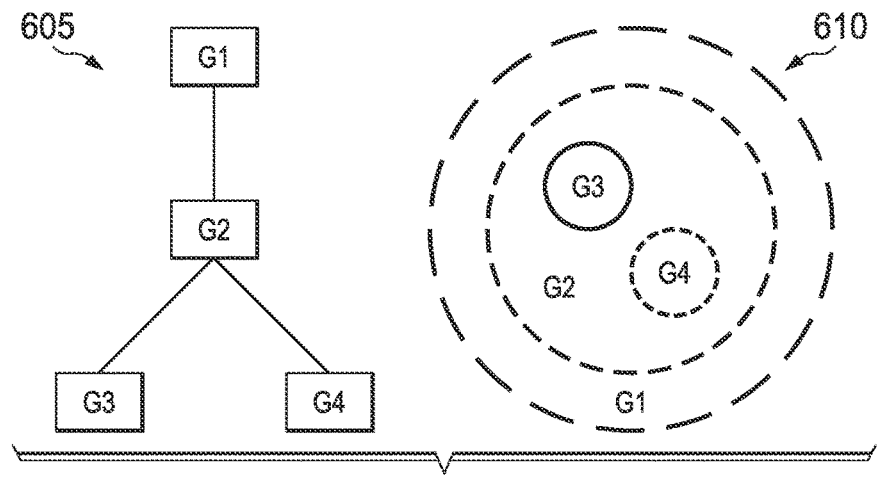
Figure 6C:
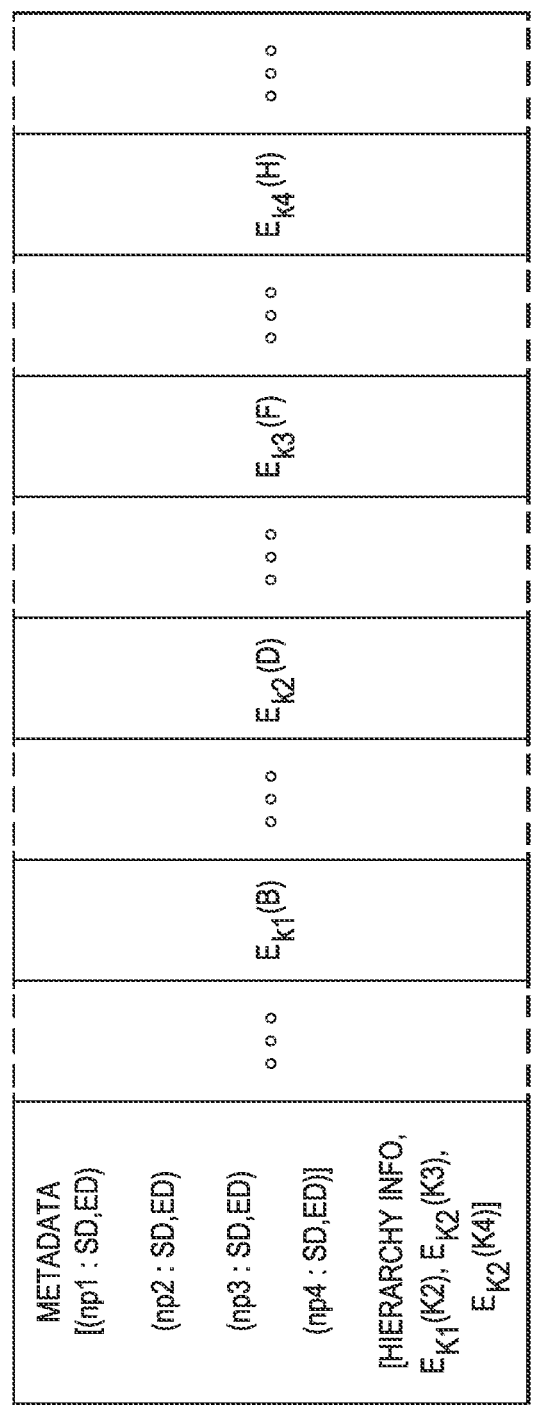

FIGS. 6A-C illustrate various aspects of this hierarchical password scheme. FIG. 6A illustrates a table indicating that among the various sections of the electronic document, a hierarchical password scheme can be used. Specifically, people in groups G3 or G4 can only see sections F or H, respectively. However, the people in group G2 can see content in sections D, F, and H, but not content in section B. The persons in group G1 can see the content of sections B, D, F, and H. FIG. 6B illustrates a tree structure 605 and a Venn diagram 610 showing one examples of the allowed access. Users in group G1 can see each of the children and grandchildren within the tree, while users in group G2 can see anything within their children, but not information available specifically to their parent group G1.

As in previous example, four named passwords (np1, np2, np3, and np4) are created, with their associated passwords (P1, P2, P3, and P4) being distributed to groups G1, G2, G3, and G4 in a suitable manner. FIG. 6C provides an illustration of an example set of security metadata associated with the example hierarchical password scheme. Similar to the prior examples, cryptographic keys are generated using a suitable key generation mechanism. Each section is encrypted using the key for the narrowest group that has access to that particular section. In the illustrated example, section B is encrypted using K1, section D is encrypted using K2, section F is encrypted using K3, and section H is encrypted using K4.

After performing the encryption, the encrypted keys of sections in relatively lower levels within the hierarchy are stored in the security metadata such that those keys can be decrypted using the key corresponding to the item immediately above it in the hierarchy. In the illustrated example, the keys K3 and K4 are encrypted using cryptographic key K2, and the encrypted values $E_{K2}(K3)$ and $E_{K2}(K3)$ are stored within the security metadata. Similarly, K2 is encrypted using the cryptographic key K1, where the encrypted value $E_{K1}(K2)$ is stored within the security metadata. In such examples, none of the keys Ki are stored non-encrypted within the electronic document or associated security metadata. FIG. 6C provides an illustration of the example security metadata associated with the hierarchy described above. In addition to the standard description of the named passwords, the security metadata includes a set of hierarchy information.

When a user opens the document after the passwords are applied, the user is prompted for the password that he has been provided. In some instances, each of the named passwords may be presented in a pop-up to the user, allowing the user to enter to password corresponding to their level of access. In other instances, a single password entry may be available, where the password received is used to generate a key that is then used to attempt to decrypt the encrypted sections. The following illustration illustrates, with reference to the example described above, how particular passwords are handled when entered.

| | |
|---|---|
| When P3 for np3 is entered: | Since P3 is correctly entered, the corresponding key K3 is generated programmatically. Using this key, only $E_{K3}(F)$ can be decrypted, and therefore only section F is revealed. |
| When P4 for np4 is entered: | Since P4 is correctly entered, the corresponding key K4 is generated programmatically. Using this key, only $E_{K4}(H)$ can be decrypted, and therefore only section H is revealed. |
| When P2 for np2 is entered: | Since P2 is correctly entered, the corresponding cryptographic key K2 is generated programmatically. Using K2, $E_{K2}(K3)$ in metadata can be decrypted to get K3. Similarly, using K2, $E_{K2}(K4)$ can be decrypted to get K4. Using K3 and K4, the data $E_{K3}(F)$ and $E_{K4}(H)$ can be decrypted thus revealing sections F and H (apart from D that was already revealed). Note that K1 cannot be derived from this information, thus section B is not revealed. |
| When P1 for np1 is entered: | Since P1 is correct, K1 can be programmatically determined. This allows the decryption of $E_{K1}(B)$ and reveals the data for section B. Further, since K1 is known, $E_{K1}(K2)$ can be decrypted to reveal K2. As above, knowledge of K2 allows us to reveal sections D, F, and H. |

| | |
|---|---|
| If no password is entered, or the password is incorrect. | Because none of the keys can be derived, the protected portions of the document remain secure. |

Figure 7:
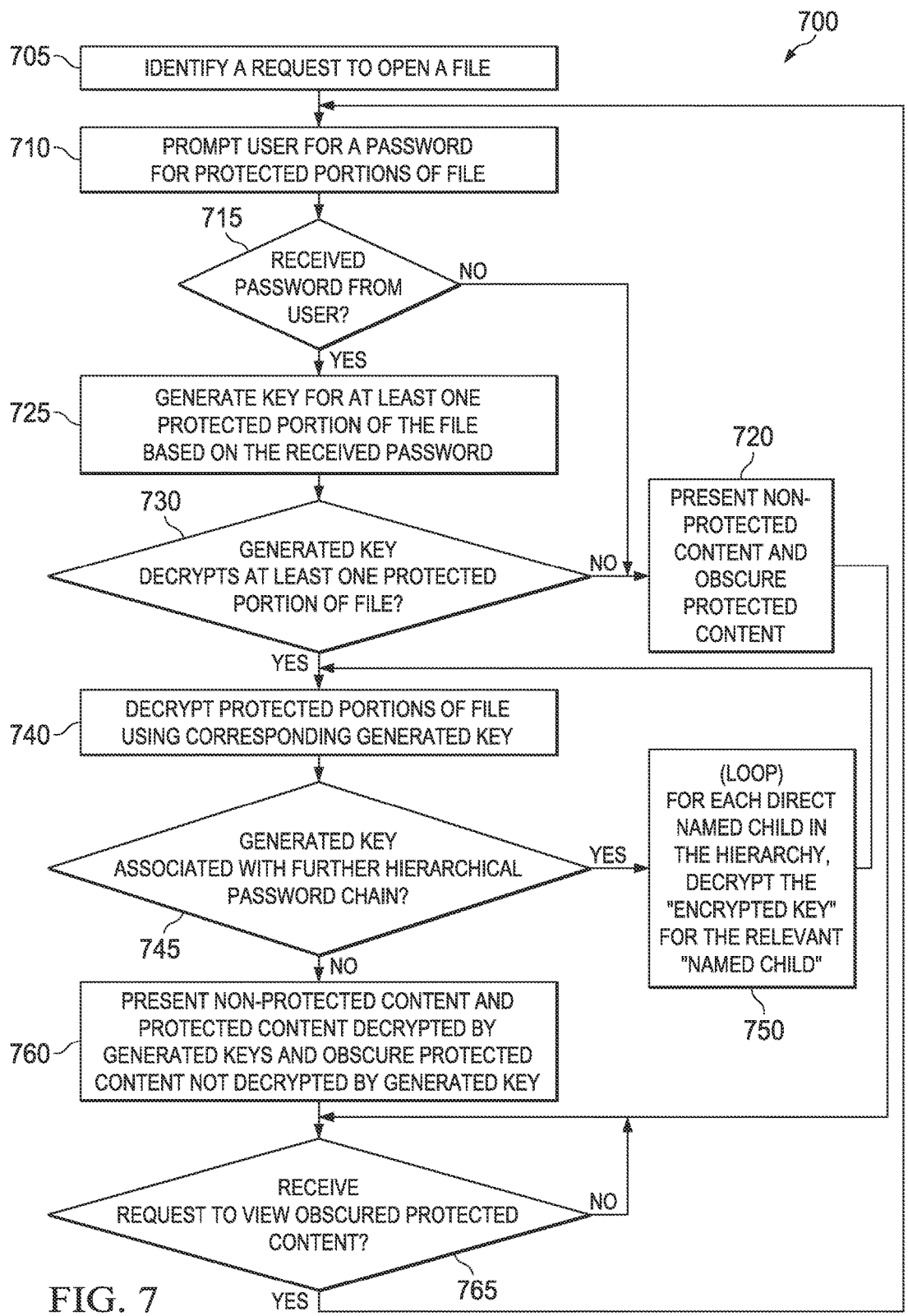
FIG. 7 is a flowchart of example operations performed to provide access to portions of an example electronic document having parallel or hierarchical password protection.

FIG. 7 is a flowchart of example operations 700 performed to provide access to portions of an example electronic document having parallel or hierarchical password protection. For clarity of presentation, the description that follows generally describes method 700 in the context of the system 100 illustrated in FIG. 1. However, it will be understood that method 700 may be performed, for example, by any other suitable system, environment, software, and hardware, or a combination of systems, environments, software, and hardware as appropriate.

At 705, a request to open a file (e.g., an electronic document) is identified. In response to the request (and a determination that at least a portion of the requested file is encrypted), the user is prompted for at least one password associated with the protected portions or sections of the file at 710. In some instances, the file may be associated with multiple passwords, such as in a parallel or hierarchical password scheme as described herein. Various user interface prompts may be used. In some instances, the prompt may include a listing of multiple possible named passwords to enter, while in others, a single entry may be available.

At 715, a determination is made as to whether a password is received from the user. If not, method 700 continue to 720, where non-protected (e.g., publically available information) content is presented, while any protected content is obscured. The content associated with the protected sections may be presented as blurred content, hidden content, content hidden by an indication of the content's protection, and other suitable formats. In some instances, the protected content may be obscured by or in association with an actionable button or tappable/interactive area to initiate the password submission process. From 720, method 700 continues at 765, where a determination is made as to whether a request to view obscured protected content is received. Operation 765 is described below.

Returning to 715, if a password is received from the user, method 700 continues at 725. At 725, a key is generated based on the received password. The password provided may be entered specific to a named password, wherein the key is generated according to the key derivation mechanism associated with that specific named password. In other instances, the password may be provided without identifying a specific named password, with the generated key being tested against each of the encrypted portions of the file. The key derivation mechanism can be defined in a set of security metadata associated with the file. The security metadata can be embedded within the file or otherwise associated with the file.

At 730, a determination is made as to whether the generated key decrypts at least one protected portion or section of the file. Where the entered password is entered specifically for a particular named password, the generated key may be initially tested only against the encrypted section associated with the named password. If the generated key does not decrypt any portions of the file, method 700 continues to 720. If, however, the generated key does decrypt at least a portion of the file, method 700 continues at 740, where the protected portions associated with the generated key are decrypted. It should be noted that in some parallel password instances, multiple passwords may be provided by the user. In those instances, parallel analysis of the passwords and the generated key may be performed concurrently and/or sequentially, with the various portions or sections of the file being decrypted together.

At 745, a determination is made as to whether the generated key is associated with a further hierarchical password chain. As described in reference to FIGS. 6A-D, hierarchical password chains include passwords for users higher in a password hierarchy that can then be used to cascade through one or more lower hierarchical levels of passwords. The set of security metadata associated with the file may include information on the hierarchy of the passwords. In those instances, encrypted keys within the hierarchy may be available such that those further encrypted keys can be decrypted and then used to obtain further keys at lower levels in the hierarchy. If the generated key is associated with a hierarchical password chain, method 700 continues at 750, wherein for each direct descendant of the current password or key within the hierarchy, the encrypted key is then decrypted to identify the key associated with next named password. Method 700 continues at 740, wherein the newly decrypted keys are used to decrypt additional protected portions of the file. Returning to 745, if the generated key is not associated with a hierarchical password chain, then method 700 continues at 760.

At 760, the non-protected content and the protected content now decrypted by the one or more generated keys are presented, while the non-decrypted protected content is obscured within the presentation. At 765, a determination is made as to whether a request is received to view any of the obscured protected content. In some instances, obscured sections and content may be selected by the user after the initial password entry request. In those instances, interacting with the obscured content, such as by clicking on or otherwise activating the content, may cause a similar password prompt as at that presented at 710, or may provide a modified prompt for any non-provided passwords. If such a request is received, method 700 returns to 710, where the new prompt is provided. In such instances, previously decrypted content and portions of the file may be considered non-protected during the second and further loops throughout the operations of method 700, thereby avoiding the need to re-enter previously entered and approved passwords. If, however, no request is received at 765, method 700 waits for such a request or movement away from the protected document.

Figure 8:
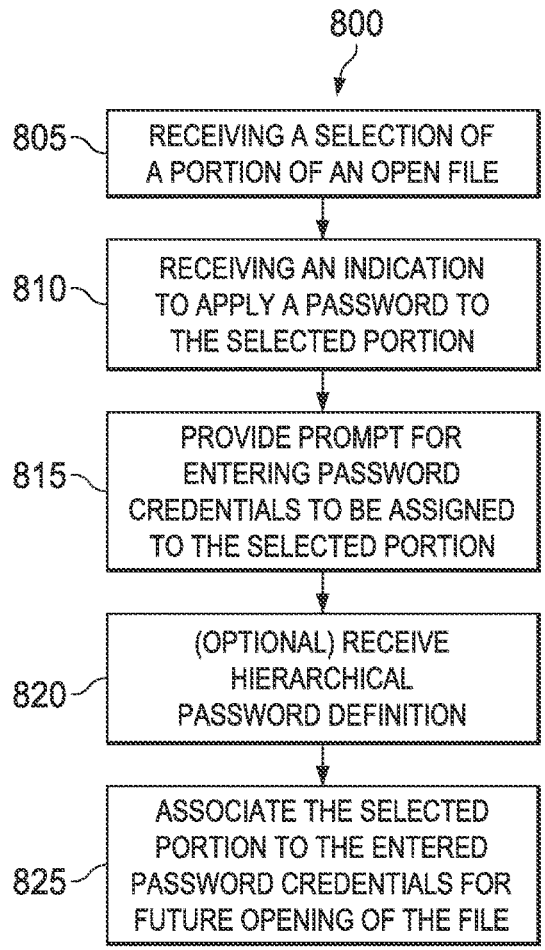
FIG. 8 is a flowchart of an example operation performed to add parallel or hierarchical password protection to an example electronic document.

FIG. 8 is a flowchart of example operations 800 performed to add parallel or hierarchical password protection to an example electronic document. For clarity of presentation, the description that follows generally describes method 800 in the context of the system 100 illustrated in FIG. 1. However, it will be understood that method 800 may be performed, for example, by any other suitable system, environment, software, and hardware, or a combination of systems, environments, software, and hardware as appropriate.

At 805, a selection of a portion of an open file is received. The open file may be an electronic document, such as a business intelligence report. The selection itself may be received via touch input, mouse input, verbal instructions, or any other suitable mechanism. The portion selected may be a single cell or multiple cells of data, a single row or multiple rows of data, a single column or multiple columns of data, a single table containing data or multiple tables, a single chart, a word, a letter, a phrase, a sentence, a paragraph, a page, or any other suitable portion of the file. In some instances, drawing or other tools may be used to define a section or portion other than based on traditional separations of content provided in electronic documents, such that a specific or relative area within the electronic document is selected.

At 810, an indication to apply a password to the selected portion can be received. The indication may be received via a touch- or gesture-based input, a mouse-click, a keyboard entry, or any other suitable means.

In response to receiving the indication at 810, a prompt is provided at 815 for the user to enter password credentials to be assigned to the selected portion. In some instances, this includes provided a password name and a password value. At 820, a hierarchical password definition may be received where the password being provided by the user is associated with a hierarchical password scheme. In such instances, the user may be able to provide a definition of the level within the hierarchy at which the current password is to exist.

At 825, the selected portion of the file is associated with the entered password to be used in future openings of the file. This may include generating a cryptographic key using the password as input. The cryptographic key can then be used to encrypt the selected portion. Information identifying the sections or portions that are encrypted, as well as the key generation mechanism and parameters used to create keys from the received passwords, can be stored within a set of security metadata associated with the file.

While not shown in FIG. 8, multiple passwords can be added to various portions of the file. After the operations of 825 are complete, for instance, a new selection of a portion or section of the file may be received, returning method 800 to 805. Where multiple passwords are received and are meant to generate a hierarchical password chain, some passwords can be encrypted by the higher level keys associated with the chain. The listing of the hierarchy can then be included within the set of security metadata to enable hierarchical passwords when the document is opened again. Alternatively, where the additional passwords exist in a parallel password scheme, no relationship between the passwords needs to be defined.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:

receiving a request to provide access to an electronic file to a user, the electronic file having a plurality of sections, wherein at least two of the sections of the electronic file are encrypted using at least two different hierarchical cryptographic keys, wherein a higher level section is associated with a first level of security clearance and is encrypted using a first hierarchical cryptographic key, wherein a lower level section is associated with a second level of security clearance and is encrypted using a second hierarchical cryptographic key different than the first hierarchical cryptographic key, the second level of security clearance is lower than the first level of security clearance, wherein the second hierarchical cryptographic key is encrypted by the first hierarchical cryptographic key, wherein the first hierarchical cryptographic key is generated based on a first password using a first key generation mechanism, wherein the second hierarchical cryptographic key is generated based on a second password using the first key generation mechanism, and wherein the electronic file is associated with a set of security metadata, the set of security metadata including a set of section definitions and a description of the encryption applied to one or more sections, wherein the set of security metadata is embedded within the electronic file;

generating a third hierarchical cryptographic key in response to receiving a third password from a user requesting access to the electronic file, wherein the third hierarchical cryptographic key is generated based on the third password using the first key generation mechanism;

comparing the third hierarchical cryptographic key to the first hierarchical cryptographic key and the second hierarchical cryptographic key to determine whether the third hierarchical cryptographic key is identical to the first hierarchical cryptographic key or the second hierarchical cryptographic key;

in response to determining the third hierarchical cryptographic key is identical to the first hierarchical cryptographic key, decrypting the higher level section encrypted using the first hierarchical cryptographic key with the third hierarchical cryptographic key;

in response to determining that the second hierarchical cryptographic key is encrypted using the first hierarchical cryptographic key, decrypting the second hierarchical cryptographic key using the third hierarchical cryptographic key;

decrypting the lower level section encrypted using the second cryptographic key with the decrypted second hierarchical cryptographic key; and in response to decrypting the lower level section, presenting the electronic file at a user interface, the presented electronic file making visible the higher level section and the lower level section.

2. The method of claim 1, further comprising:

in response to determining the third hierarchical cryptographic key is identical to the second hierarchical cryptographic key, decrypting the lower level section encrypted using the second hierarchical cryptographic key with the third hierarchical cryptographic key; and presenting the electronic file at a user interface, the presented electronic file making visible the lower level section and obscuring the higher level section.

3. A non-transitory, computer-readable medium storing computer-readable instructions, the instructions executable by at least one processor and operable when executed to:

receive a request to provide access to an electronic file to a user, the electronic file having a plurality of sections, wherein at least two of the sections of the electronic file are encrypted using at least two different hierarchical cryptographic keys, wherein a higher level section is associated with a first level in an organizational hierarchy and is encrypted using a first hierarchical cryptographic key, wherein a lower level section is associated with a second level in an organizational hierarchy and is encrypted using a second hierarchical cryptographic key different than the first hierarchical cryptographic key, wherein the second hierarchical cryptographic key is encrypted by the first hierarchical cryptographic key, the second level in the organizational hierarchy is lower than the first level in the organizational hierarchy, wherein the first hierarchical cryptographic key is generated based on a first password using a first key generation mechanism, wherein the second hierarchical cryptographic key is generated based on a second password using the first key generation mechanism, and wherein the electronic file is associated with a set of security metadata, the set of security metadata including a set of section definitions and a description of the encryption applied to one or more sections, wherein the set of security metadata is embedded within the electronic file;

generate a third hierarchical cryptographic key in response to receiving a third password from a user requesting access to the electronic file, wherein the third hierarchical cryptographic key is generated based on the third password using the first key generation mechanism;

compare the third hierarchical cryptographic key to the first hierarchical cryptographic key and the second hierarchical cryptographic key to determine whether the third hierarchical cryptographic key is identical to the first hierarchical cryptographic key or the second hierarchical cryptographic key;

in response to determining the third hierarchical cryptographic key is identical to the first hierarchical cryptographic key, decrypt the higher level section encrypted using the first hierarchical cryptographic key with the third hierarchical cryptographic key;

in response to determining that the second hierarchical cryptographic key is encrypted using the first hierarchical cryptographic key, decrypt the second hierarchical cryptographic key using the third hierarchical cryptographic key;

decrypt the lower level section encrypted using the second cryptographic key with the decrypted second hierarchical cryptographic key; and in response to decrypting the lower level section, present the electronic file at a user interface, the presented electronic file making visible the higher level section and the lower level section.

4. The medium of claim 3, the instructions further operable when executed to:

in response to determining the third hierarchical cryptographic key is identical to the second hierarchical cryptographic key, decrypt the lower level section encrypted using the second hierarchical cryptographic key with the third hierarchical cryptographic key; and presenting the electronic file at a user interface, the presented electronic file making visible the lower level section and obscuring the higher level section.

5. A system comprising:
at least one processor; and
a memory communicatively coupled to the at least one processor, the memory storing instructions which, when executed by the at least one processor, cause the at least one processor to perform operations comprising:

receiving a request to provide access to an electronic file to a user, the electronic file having a plurality of sections, wherein at least two of the sections of the electronic file are encrypted using at least two different hierarchical cryptographic keys, wherein a higher level section is associated with a first level of security clearance and is encrypted using a first hierarchical cryptographic key, wherein a lower level section is associated with a second level of security clearance and is encrypted using a second hierarchical cryptographic key different than the first hierarchical cryptographic key, the second level of security clearance is lower than the first level of security clearance, wherein the second hierarchical cryptographic key is encrypted by the first hierarchical cryptographic key, wherein the first hierarchical cryptographic key is generated based on a first password using a first key generation mechanism, wherein the second hierarchical cryptographic key is generated based on a second password using the first key generation mechanism, and wherein the electronic file is associated with a set of security metadata, the set of security metadata including a set of section definitions and a description of the encryption applied to one or more sections, wherein the set of security metadata is embedded within the electronic file;

generating a third hierarchical cryptographic key in response to receiving a third password from a user requesting access to the electronic file, wherein the third hierarchical cryptographic key is generated based on the third password using the first key generation mechanism;

comparing the third hierarchical cryptographic key to the first hierarchical cryptographic key and the second hierarchical cryptographic key to determine whether the third hierarchical cryptographic key is identical to the first hierarchical cryptographic key or the second hierarchical cryptographic key;

in response to determining the third hierarchical cryptographic key is identical to the first hierarchical cryptographic key, decrypting the higher level section encrypted using the first hierarchical cryptographic key with the third hierarchical cryptographic key;

in response to determining that the second hierarchical cryptographic key is encrypted using the first hierarchical cryptographic key, decrypting the second hierarchical cryptographic key using the third hierarchical cryptographic key;

decrypting the lower level section encrypted using the second cryptographic key with the decrypted second hierarchical cryptographic key; and in response to decrypting the lower level section, presenting the electronic file at a user interface, the presented electronic file making visible the higher level section and the lower level section.

* * * * *